March 24, 1942.    W. W. STANFIELD    2,277,420
AUTOMATIC RATIO POULTRY AND STOCK FEEDER
Filed May 15, 1940    4 Sheets-Sheet 1

Inventor
WILLIAM WESLEY STANFIELD,
By Clarence A. O'Brien
Attorney

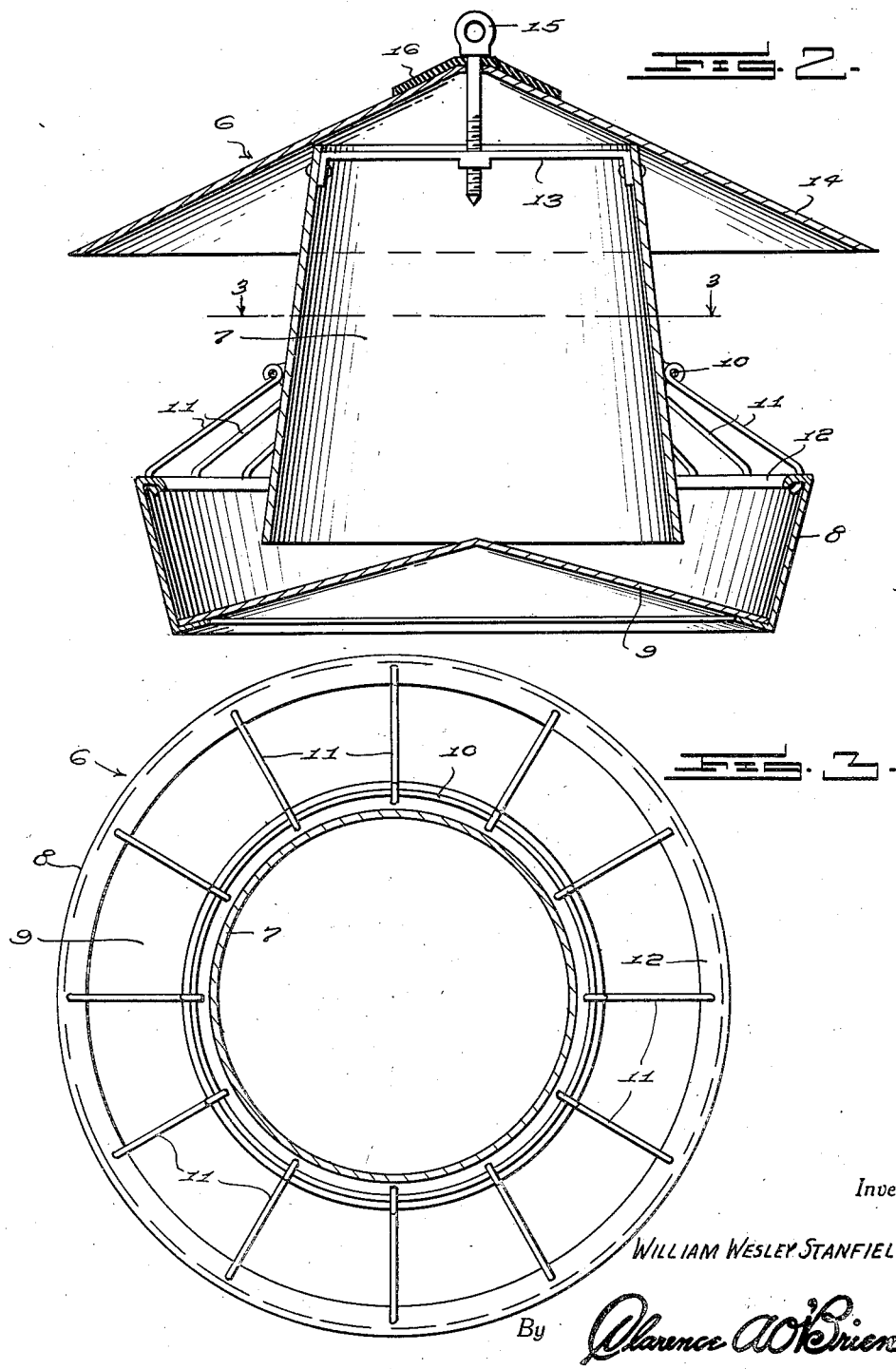

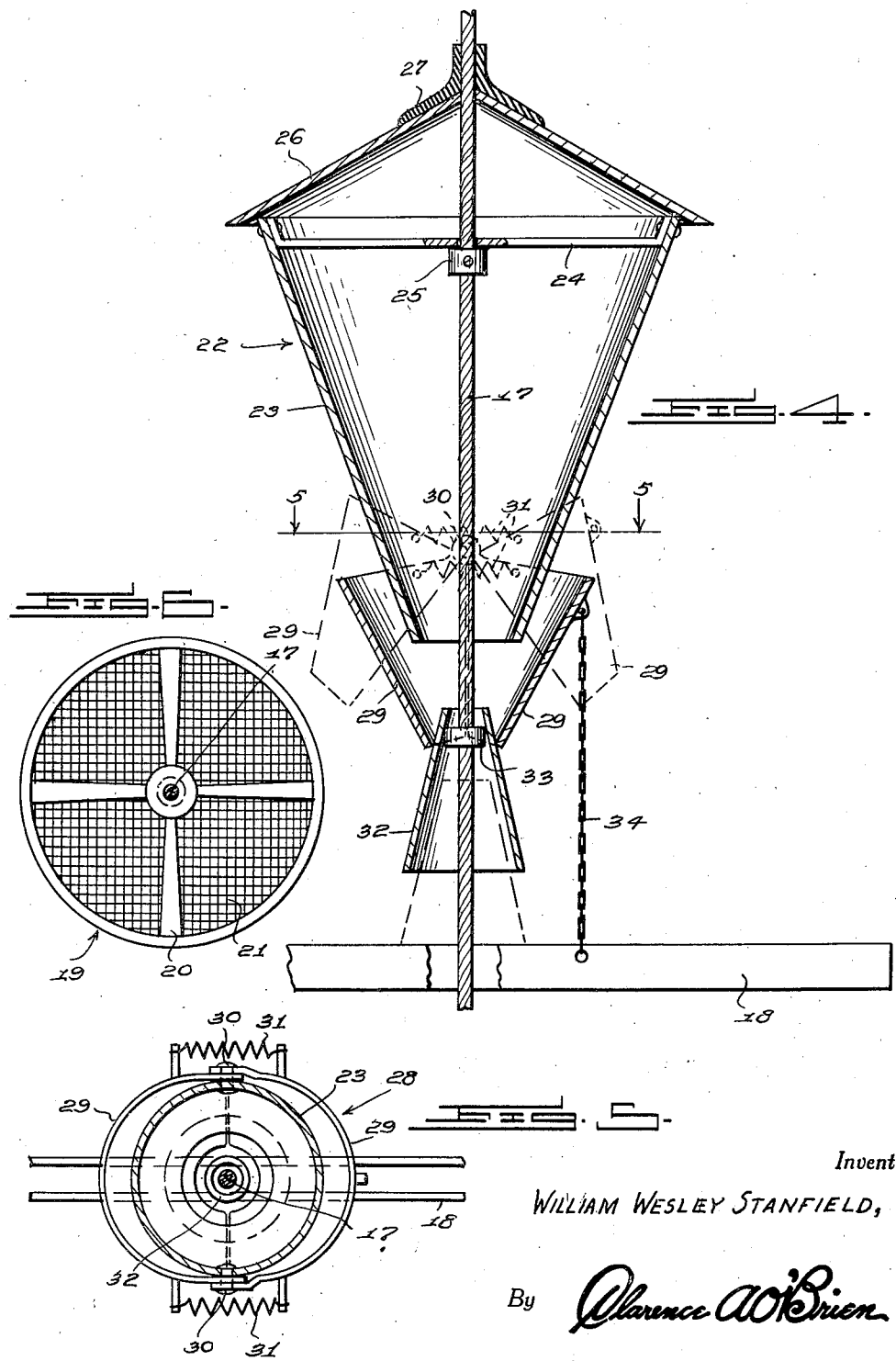

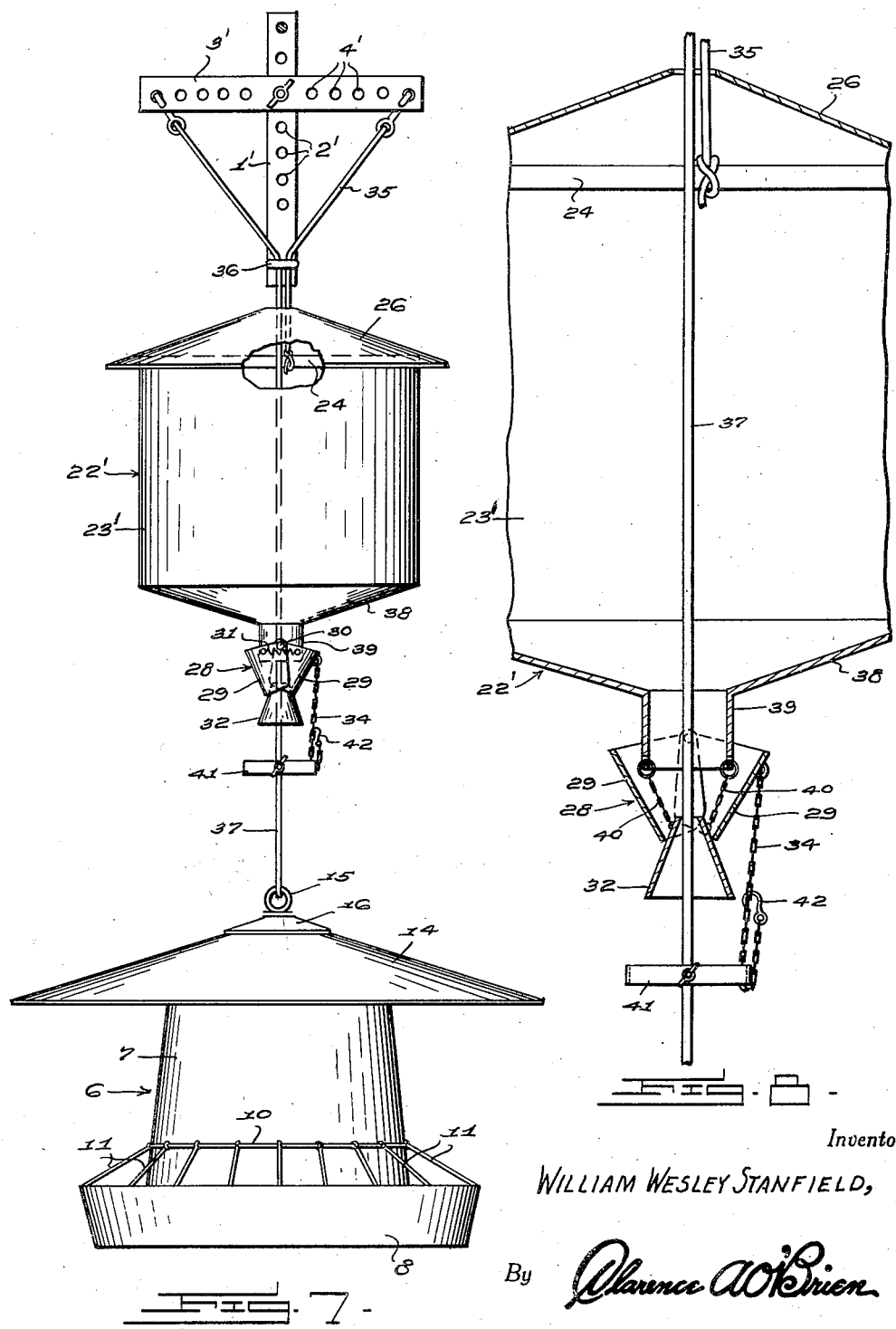

Patented Mar. 24, 1942

2,277,420

UNITED STATES PATENT OFFICE 2,277,420

AUTOMATIC RATIO POULTRY AND STOCK FEEDER

William Wesley Stanfield, Largo, Fla.

Application May 15, 1940, Serial No. 335,412

7 Claims. (Cl. 119—51)

The present invention relates to new and useful improvements in poultry and stock feeders and has for its primary object to provide, in a manner as hereinafter set forth, an apparatus of this character embodying a novel construction and arrangement for automatically feeding alternately to the birds or animals two different kinds of feeds in the desired ratio.

Other objects of the invention are to provide a poultry or stock feeder of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in vertical section through the mash unit.

Figure 3 is a view in horizontal section, taken substantially on the line 3—3 of Fig. 2.

Figure 4 is a view in vertical section through the grain unit.

Figure 5 is a view in horizontal section, taken substantially on the line 5—5 of Fig. 4.

Figure 6 is a view in horizontal section, taken substantially on the line 6—6 of Fig. 1, showing the grain spreader in top plan.

Figure 7 is an elevational view of a modified form of the invention, a portion of the grain unit being broken away.

Figure 8 is a view in vertical section through an upper portion of the modification.

Figure 1:
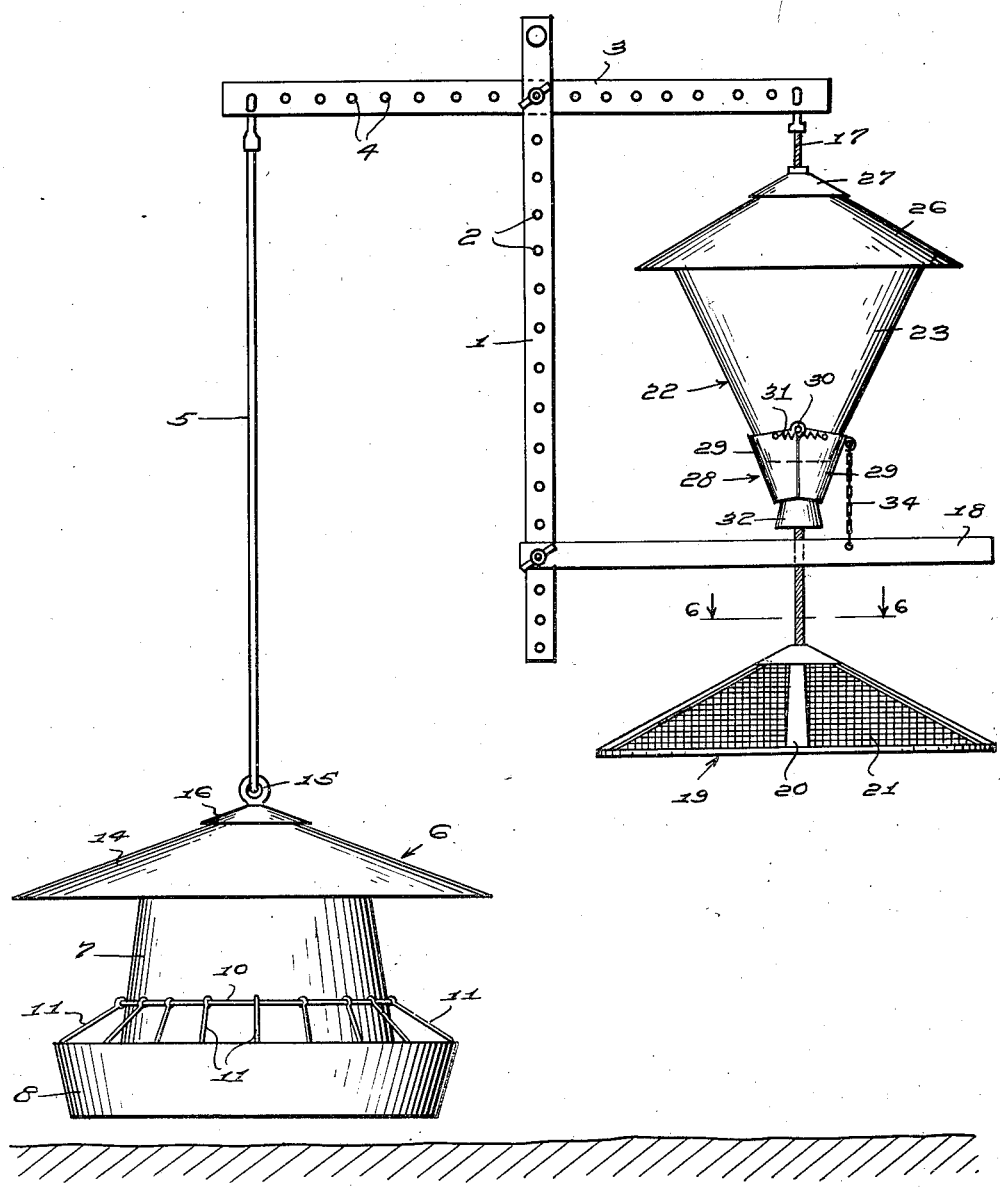
Figure 1 is a view in side elevation of an automatic poultry or stock feeder constructed in accordance with the present invention.

Referring now to the drawings in detail, it will be seen that one embodiment of the invention which has been illustrated comprises a hanger 1 in the form of a bar of suitable metal which is adapted to be suspended from a support. The hanger 1 is provided with a plurality of spaced openings 2. Adjustably and pivotally mounted on the upper portion of the hanger 1 is a beam 3. The beam 3 is provided with a series of spaced openings 4 and suspended from said beam is a support 5 in the form of a rod or cable. The openings 4 permit adjustment of the rod 5 on the beam 3.

Suspended from the lower end of the rod 5, is a mash unit which is designated generally by the reference numeral 6. As best seen in Fig. 2 of the drawings, the unit 6 includes a tapered hopper 7 for the reception of the mash, said hopper being open at both ends. Suspended beneath the hopper 7 for receiving the mash therefrom is a pan 8. The pan 8 comprises a conical bottom 9 which is spaced from the lower end of the hopper 7. It will be observed that the pan 8 is suspended from the hopper 7 by means including a ring 10 mounted on said hopper at an intermediate point. Mounted on the ring 10 are downwardly and outwardly extending rods 11 having their outer end portions secured in the internal rim or flange 12 of the pan 8. The rods 11 also function as spacers for the poultry and the member 12 serves as a guard for preventing the mash from being thrown out of the pan 8.

The unit 6 further includes a bar 13 which is mounted diametrically in the upper portion of the hopper 7. Removably mounted on top of the hopper 7 is a substantially conical canopy 14. The apex of the canopy 14 has formed therein an opening for accommodating a securing eye bolt 15 which is threaded through an opening provided therefor in the bar 13. The lower end of the rod 5 is connected to the eye of the bolt 15. A rubber cap 16 seals the canopy 14 against leakage around the eye bolt or screw 15.

Suspended from the other end portion of the beam 3, and adjustable thereon, is a rope or cable 17. The cable 17 passes downwardly through a substantially U-shaped arm or stop bar 18 which is adjustably mounted on the lower portion of the hanger 1. Mounted on the lower end portion of the cable 17 is a substantially conical grain spreader which is designated generally by the reference numeral 19. The spreader 19 includes a suitable frame structure 20 having mounted thereon a screen 21 which may be of any desired mesh.

Also mounted on the cable 17, above the arm 18, is a grain unit which is designated generally by the reference numeral 22. Referring now to Fig. 4 of the drawings, it will be observed that the unit 22 comprises a downwardly tapering or substantially conical hopper 23 for the reception of the grain, said hopper being open at both ends. Mounted diametrically in the upper portion of the hopper 23 is a bar 24 through which the cable 17 passes. The bar 24 is adapted to rest on a collar or enlargement 25 on the cable 17 for supporting the hopper 23 on said cable. Slidably mounted on the cable 17 is a canopy 26 for closing the top of the hopper 23. A rubber cap 27 on the cable 17 prevents leakage through the opening in the canopy 26 which accommodates said cable.

Mounted on the lower portion of the hopper 23 is what may be referred to as a clam shell bucket or valve 28 for controlling the discharge of the grain from said hopper. The clam shell bucket 28 comprises complemental half sections 29 which are pivotally secured to diametrically opposite sides of the lower portion of the hopper 23, as at 30. Coil springs 31 are connected to the sections 29 of the clam shell bucket 28 adjacent the pivotal connections 30 thereof for securing said sections 29 in either open or closed position.

Mounted on the cable 17 below the clam shell bucket 28 is a cam or cone 32. A collar or enlargement 33 on the cable 17 supports the cone 32. A flexible member 34 in the form of a chain has one end connected to the arm 18 and its other end connected to one of the sections 29 for closing the clam shell bucket 28.

In use, the hopper 7 is filled with mash by removing the canopy 14 and the grain is placed in the hopper 23 by sliding the canopy 26 upwardly on the cable 17. With the unit 6 in lowered position and the unit 22 in raised or elevated position, as seen in Fig. 1 of the drawings, the clam shell bucket 28 is closed (see Fig. 4) thereby preventing discharge of the grain from the hopper 23. With the unit 6 in this position the poultry may consume a portion of the mash which gravitates to the pan 8 from the hopper 7. When, in this manner, the unit 6 has been lightened sufficiently to be overbalanced by the unit 22, said unit 6 is elevated to a desired height and said unit 22 moves downwardly. When the cone 32 comes to rest on the arm or stop bar 18 the cable 17 continues to move downwardly therethrough and the clam shell bucket 28 continues to move downwardly thereon. Thus, the sections 29 of the clam shell bucket 28 are opened for releasing the grain. The construction and arrangement of the coil springs 31 is such as to yieldingly secure the sections 29 in either open or closed position after they swing past dead center. Some of the grain which is thus discharged from the hopper 23 strikes the spreader 19 and passes through the screen 21 thereof and the rest of said grain is spread thereby. When enough grain has been discharged to lighten the unit 22 sufficiently for it to be overbalanced by the unit 6 said unit 22 is again elevated by the cable 17. As the cable 17 passes upwardly the collar 33 picks up the cone 32 and the chain 34 closes the clam shell bucket 28 on said cone. The chain 34 also functions as a means for positively limiting the upward movement of the unit 22 and the downward movement of the unit 6.

In the modification illustrated in Figs. 7 and 8 of the drawings, the hopper 23' of the grain unit 22 is suspended from one end portion of the pivoted beam 3' by a flexible rope or cable 35. The cable 35 passes slidably through a guide 36 on the lower portion of the hanger 1' and is connected at its lower end to the bar 24 in the hopper 23'. The mash unit 6 is suspended from a flexible rope or cable 37 which passes slidably through the hopper 23' of the unit 22' and the guide 36 and is connected to the other end portion of the beam 3'. Thus, the units 22' and 6 are suspended for vertical movement one above the other.

It will be observed that the hopper 23' of the grain unit 22' in this modification is cylindrical and comprises a substantially conical or tapered bottom 38 from which a discharge neck 39 depends. The cone 32, through which the cable 37 is slidable, is suspended from the discharge neck 39 through the medium of chains 40. Adjustably secured in any suitable manner on the cable 37 below the cone 32 is a stop bar 41. The chain 34 is adjustably and detachably connected to the stop bar 41 through the medium of a hook 42.

In the operation of the modification, when the unit 6 has been sufficiently lightened by the consumption of mash therefrom, said unit 6 is overbalanced and elevated to a desired height by the grain unit 22' which moves downwardly. Thus, as the cable 37 moves upwardly and the unit 22' moves downwardly the cone 32 is engaged by the stop bar 41 and caused to open the clam shell bucket 28. Grain now flows by gravity from the hopper 23' and strikes the substantially conical top or canopy 14 of the unit 6 which functions as a spreader. When the unit 22' has been sufficiently lightened in this manner said unit is returned to elevated position by the mash unit 6 which returns to its lowered position. When the hopper 23' is elevated the cone 32 rests on the stop bar 41 until picked up by the chains 40 and the chain 34 closes the clam shell bucket 28 on said cone. The hanger 1' has a series of openings 2' for the adjustment of the beam 3' vertically and said beam 3' has a series of openings 4' to permit said beam 3' to be adjusted endwise on the hanger 1' to change the balance of said beam 3'.

It is believed that the many advantages of an automatic ratio poultry and stock feeder constructed in accordance with the present invention will be readily understood and although preferred embodiments of the apparatus are as illustrated and described, it is to be understood that further modifications and changes in the details of construction may be resorted to which will fall within the scope of the invention as claimed.

What is claimed is:

1. A poultry feeder comprising a pivotally mounted beam, feed units suspended from said beam on opposite sides of the pivotal axis thereof, one of said units comprising a hopper having an opening in its bottom for the discharge of feed by gravity therefrom and a member located below the opening, a clam shell bucket type valve mounted on the lower portion of the hopper and coacting with said member for controlling the discharge of the feed therefrom, said member being engageable in the clam shell bucket valve for opening same when the hopper moves downwardly, and means for closing the clam shell bucket valve when the hopper moves upwardly.

2. A poultry feeder comprising a hanger adapted to be suspended from a support, a beam pivotally mounted, at an intermediate point, on said hanger, feed units suspended from the end portions of the beam, a member projecting from the hanger, one of the units comprising a cable suspended from the beam, a hopper mounted on said cable above the member and having an opening in its lower end for the discharge of the feed by gravity, a cone slidably mounted on the cable below the opening, a clam shell bucket pivotally mounted on the lower portion of the hopper and coacting with said cone for controlling the discharge of the feed therefrom, said cone being slidably mounted on the cable and operable by the member for opening the clam shell bucket, and a spreader for the feed mounted on the lower end portion of the cable.

3. A feeder of the class described comprising, in combination, a supporting structure, a pair of vertically movable, gravity operated feed units mounted one above the other on said supporting structure and balanced against each other, and means for opening and closing the uppermost unit upon downward and upward movement thereof for controlling the discharge of feed therefrom.

4. A feeder of the class described comprising, in combination, a supporting member pivotally mounted at an intermediate point, a feed unit, means suspending said feed unit from one end portion of the member, and a feed unit suspended from the other end portion of said member and slidable on said means above the first named unit.

5. A feeder of the class described comprising a supporting member pivotally mounted at an intermediate point, a flexible member suspended from the supporting member on one side of the pivot thereof, a feed unit suspended from said flexible member, another flexible member suspended from the supporting member on the other side of the pivot thereof, a feed unit suspended from the second named flexible member and slidable on the first named flexible member above the first named feed unit, and coacting means on said first named flexible member and on the second named unit for controlling the discharge of feed therefrom upon downward and upward movement thereof.

6. A feeder of the class described comprising a supporting bar pivotally mounted at an intermediate point for swinging movement in a vertical plane, a cable suspended from one end portion of said bar, a feed unit suspended from said cable, a cable suspended from the other end portion of the bar, a feed unit suspended from the second named cable and slidable on the first named cable, the second named unit including a hopper for the reception of feed, said hopper having a discharge opening in its bottom, a valve pivotally mounted on the hopper for controlling the discharge of feed therefrom, a cone suspended from the hopper and movable vertically relative thereto, said cone being slidable on the first named cable and further being engageable with the valve for opening same, a member on the first named cable engageable with the cone for actuating same for opening the valve upon downward movement of the hopper, and means connecting the valve to the member for closing said valve upon upward movement of the hopper.

7. A feeder of the class described comprising a supporting hanger, a guide on the lower portion of said hanger, a supporting bar pivotally mounted, at an intermediate point, on the hanger for swinging movement in a vertical plane, a flexible cable suspended from one end portion of the bar and slidable through the guide, a feed unit suspended from said cable, a flexible cable suspended from the other end portion of the bar and slidable through the guide, a feed unit suspended from the second named cable and slidable on the first named cable above the first named feed unit, and means for controlling the discharge of feed from the second named unit upon downward and upward movement thereof.

WILLIAM WESLEY STANFIELD.